United States Patent [19]

Richt

[11] 3,917,190

[45] Nov. 4, 1975

[54] TRANSPORT MECHANISM FOR MAGNETIC-TAPE DEVICES, ESPECIALLY MAGNETIC TAPE CASSETTE DEVICES

[75] Inventor: Oskar Hubert Richt, Socking, Germany

[73] Assignee: Uher Werke Munchen, Munich, Germany

[22] Filed: Dec. 4, 1973

[21] Appl. No.: 421,723

[30] Foreign Application Priority Data

Dec. 5, 1972 Germany .......................... 2259497

[52] U.S. Cl. .................................. 242/191; 242/203

[51] Int. Cl.² ....................B65H 59/38; G03B 15/32; G11B 15/13

[58] Field of Search ........ 242/186, 191, 203; 318/6, 318/7; 360/73

[56] References Cited

UNITED STATES PATENTS

| | | | |
|---|---|---|---|
| 3,203,636 | 8/1965 | Owen | 242/203 |
| 3,414,269 | 12/1968 | Appel | 242/199 |
| 3,423,038 | 1/1969 | Katzef et al. | 242/199 |
| 3,764,087 | 10/1973 | Paananen et al. | 242/191 |

*Primary Examiner*—Leonard D. Christian
*Attorney, Agent, or Firm*—Diller, Brown, Ramik & Wight

[57] ABSTRACT

In a magnetic-tape device, especially a magnetic-tape cassette device, the tape coils of which are driven by means of one or more DC motors, especially commutator motors, with ironless rotors without the interposition of slipper clutches, the tacho-voltage and/or the counter e.m.f. of the DC motor or motors serves, when the end-of-tape condition is reached, to disconnect the tape drive and/or to reverse the tape driving direction and/or, during tape drive, to regulate the tape tension for the rewinding side and/or unwinding side and/or to indicate the tape supply.

11 Claims, 5 Drawing Figures

TRANSPORT MECHANISM FOR MAGNETIC-TAPE DEVICES, ESPECIALLY MAGNETIC TAPE CASSETTE DEVICES

The invention relates to a transport mechanism for magnetic-tape devices, especially magnetic-tape cassette devices, the tape coils of which are driven by means of one or more DC motors, especially commutator motors, with ironless rotors without the interposition of slipper clutches.

In a known transport mechanism of this kind use is made of a sensor lever resting on the tape to control the tape tension. This sensor lever causes the braking force and driving force to switch over when a given spool diameter is reached. A disadvantage of this known arrangement consists in the fact that the tape tension is not controlled continuously and that mechanical aids are necessary to switch over the electric braking action as a function of the spool.

The object of the invention is therefore seen in the regulation of the tape tension, in the indication of the tape supply, in the disconnection of the tape drive and in the change-over of the running direction of the tape with the aid of electrical means alone in the transport mechanism set forth at the beginning.

In accordance with the invention this object is achieved in that the tacho-voltage and/or counter e.m.f. of the DC motor or motors serves, when the end-of-tape condition is reached, to disconnect the tape drive and/or to reverse the running direction of the tape and/or, during tape drive, to regulate the tape tension for the rewinding side and/or unwinding side and/or to indicate the tape supply.

The invention proceeds from the fact that the tape coils are driven without the interposition of slipper clutches. The invention is based on the deliberation that at a constant tape speed the speed of rotation of the tape coils is inversely proportional to the diameter of the tape coils. Hence, the tacho-voltage or counter e.m.f. obtained from the speeds of the motors is a direct yardstick for the diameter of the tape coils. If the electrical braking or feeding action of the tape coil motors is now controlled by a signal corresponding to the tachovoltage or counter e.m.f., one will achieve a tape tension which is independent of the tape coil diameter.

Using the same signal, it is also possible to produce a tape supply and/or running direction indication by inserting an appropriately calibrated galvanometer.

When the tape end which is fastened to the coil core is reached and thus comes to a standstill at the end of the coil, it is further possible to disconnect the tape drive and/or to reverse the tape running direction by omitting the signal corresponding to the tacho-voltage or counter e.m.f.

The signal corresponding to the tacho-voltage or counter e.m.f. can be edited and amplified by customary electronic circuits, e.g. transistor circuits.

The invention will be explained below in greater detail with reference to embodiments and the attached drawings.

Figure 1:
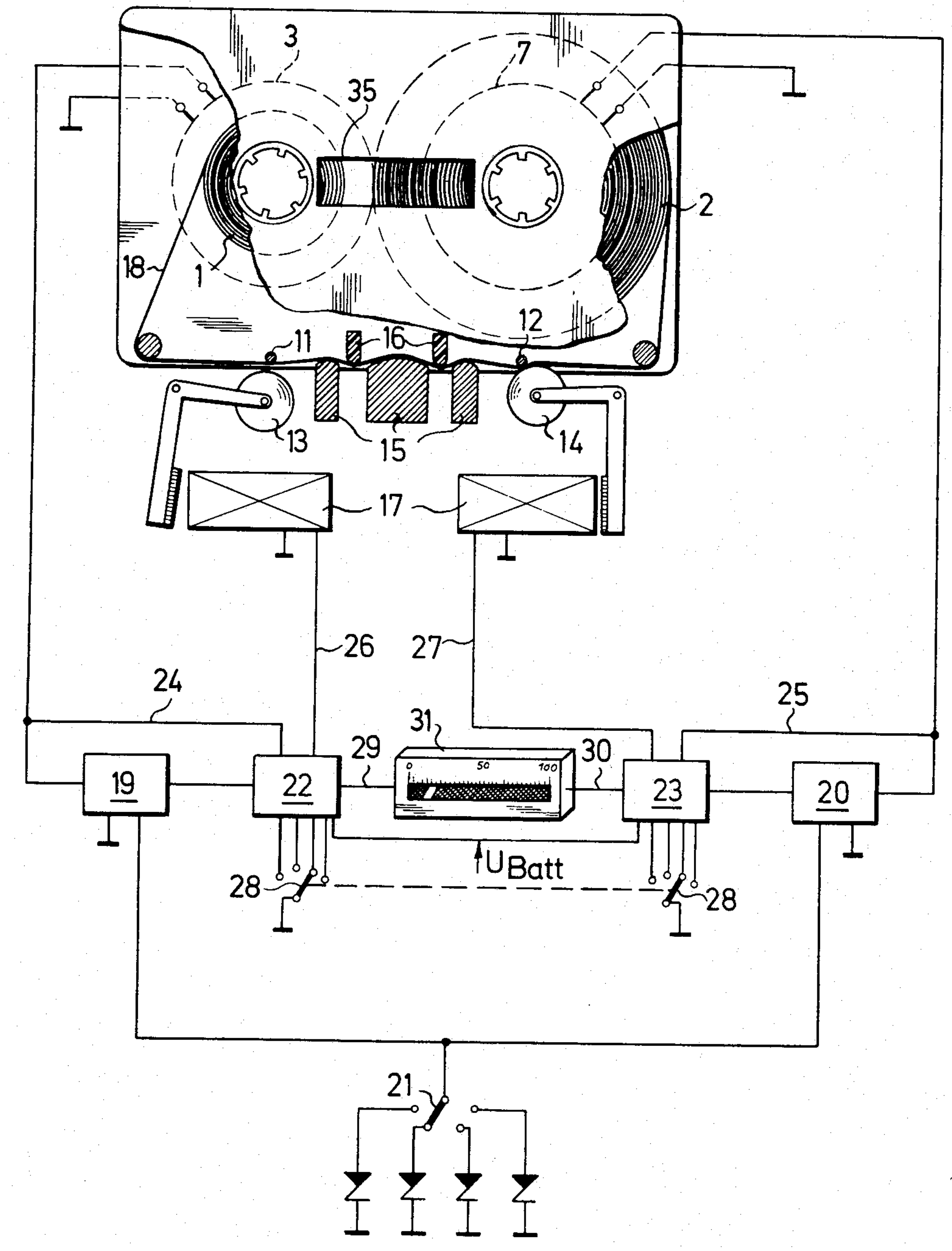
FIG. 1 is a view which shows a transport mechanism for a cassette device with the regulating and controlling facility according to the invention, one drive being provided for each spool.
Figure 2:
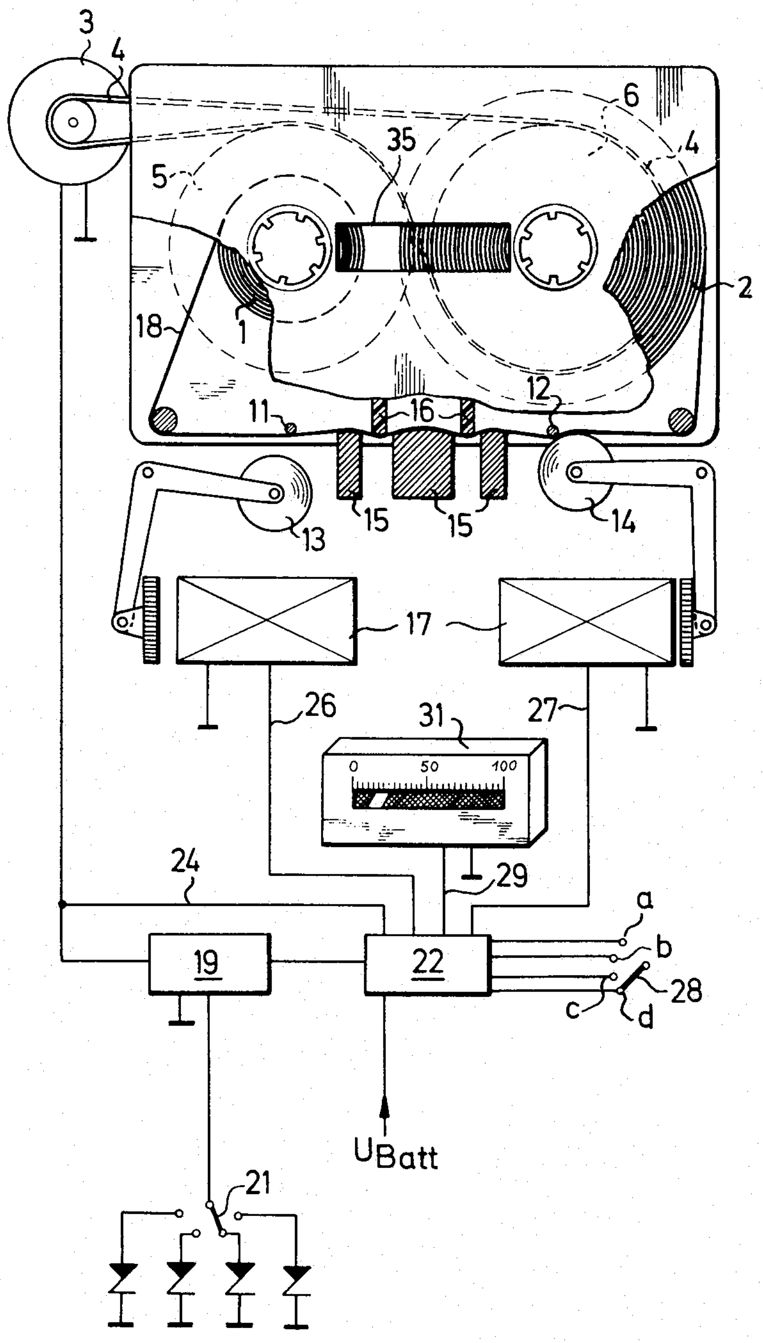
FIG. 2 is a view which shows a cassette device having a single drive motor for both spools and also with the regulating and controlling facility according to the invention.
Figure 3:
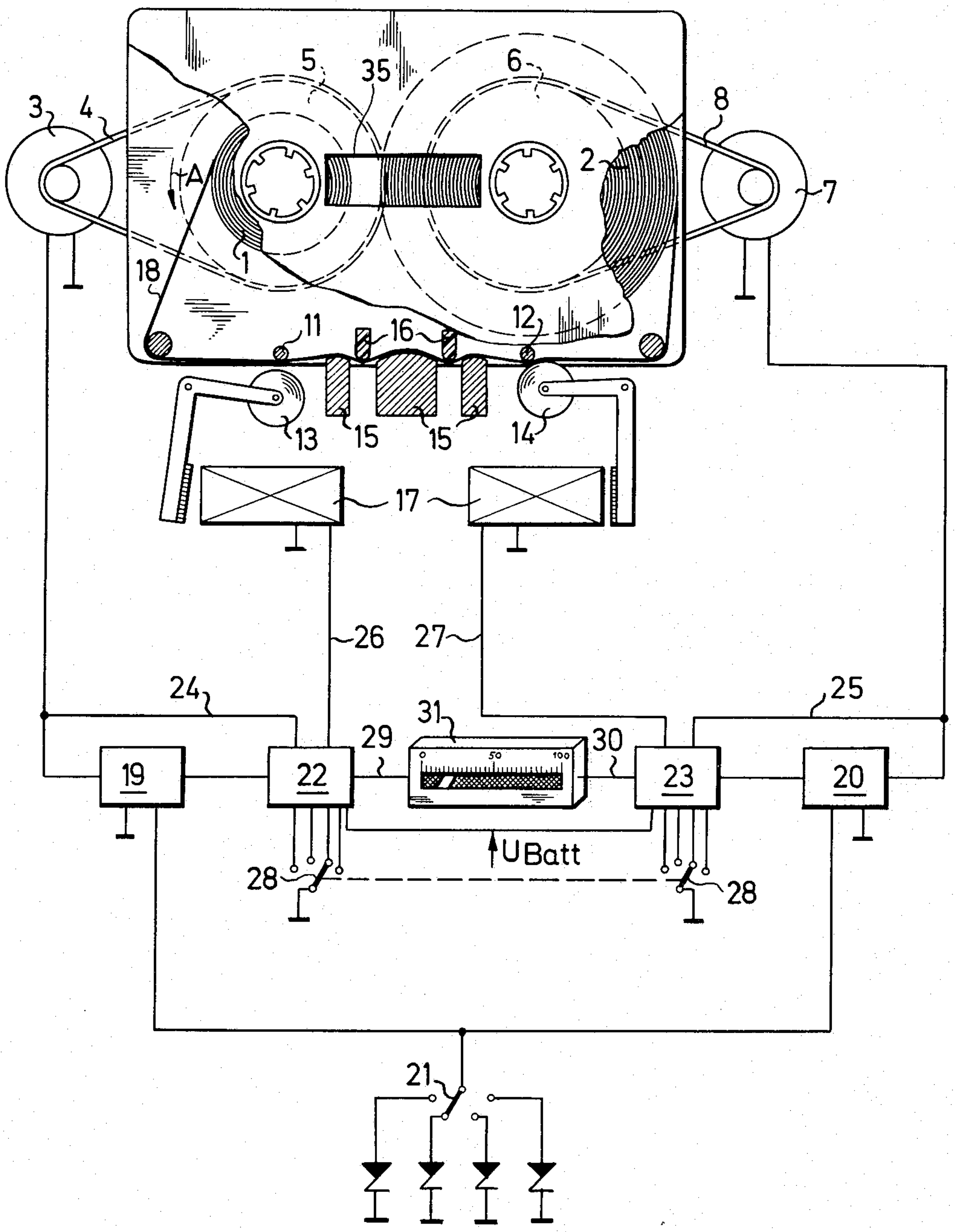
FIG. 3 is a view which shows a cassette device with a drive motor for each of the two tape coils, the driving action being effected by way of a belt, and also with a regulating and controlling facility according to the invention.

FIGS. 1 to 3 show cassette devices having tape coils 1 and 2. In FIG. 1 the drive is effected directly by motors 3 and 7, one being arranged under one tape coil and the other under the other coil. In FIG. 2 the drive is effected by means of a single motor 3 which drives, via a belt 4, driving wheels 5 and 6 which can be coupled to tape coils 1 and 2 in known fashion. In FIG. 3 there are two motors 3 and 7 which drive, via belts 4 and 8, driving wheels 5 and 6 which can similarly be coupled to tape coils 1 and 2 in known fashion.

Figure 4:
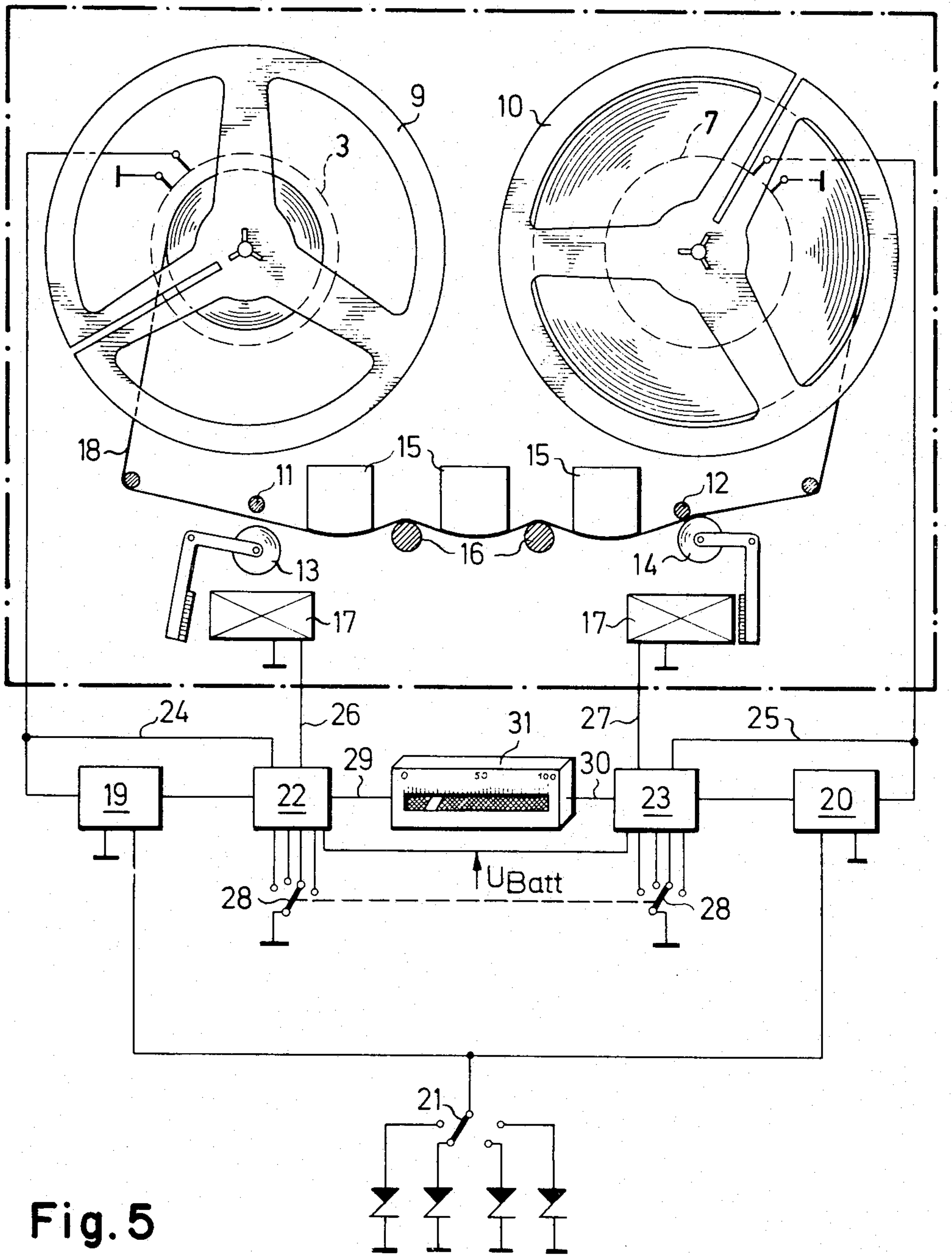
FIG. 4 is a view which shows a spool-spool device with a drive motor for each of the two spools and also with a regulating and controlling facility according to the invention.

In FIG. 4 spools 9 and 10 are driven directly by means of motors 3 and 7 being arranged under spools 9 and 10, respectively.

The tapes are drawn in known fashion at constant speed off tape coils 1 and 2 or spools 9 and 10 by means of driving spindles 11 and 12 which interact with pressure rollers 13 and 14. The tapes are guided here over magnetic heads 16 by means of tape guide means 15. Further, power magnets 17 are provided which press the tapes alternately against driving spindles 11 and 12 by means of pressure rollers 13 and 14.

The tacho-voltage or counter e.m.f. generated by motors 3 and 7 is fed into comparators 19 and 20, respectively. Further, a reference voltage corresponding to the given tape speed is fed into comparators 19 or 20. A switch 21 is provided for this purpose, which can be applied to the appropriate contacts corresponding to the given tape speeds. The outputs of comparators 19 and 20 are applied to positioning elements 22 and 23, respectively. In the event that the tape is being driven by driving spindle 12 and transported in the direction of arrow A (FIG. 3), a signal will be fed to motor 3 from positioning element 22 via output 24, which signal controls the braking action of motor 3 in such a manner that constant tension acts on tape 18 independently of the coil diameter on tape coil 1. A signal is fed to motor 7 from positioning element 23 via output 25, which signal so regulates the driving action of this motor that the latter so drives tape 18 that a constant tape tension is achieved. Further, positioning elements 22 and 23 have outputs 26 and 27, respectively, which lead to the respective power magnets 17. Outputs 26 and 27 feed a signal to the associated power magnets 17 to the effect that the tape drive is switched off or the tape running direction is reversed when the end-of-tape condition is reached. When the end of the tape is reached, motors 3 and 7 stop so that the tacho-voltage or counter e.m.f. moves to zero and comparators 19 and 20 feed corresponding signals to positioning elements 22 and 23, respectively, which supply the desired signals through outputs 26 and 27, respectively, in keeping with a program set by a switch 28. Switch 28 can take up four positions *a*, *b*, *c*, *d* for example. Switch position *a* programs positioning elements 22 and 23 so that, when motors 3 and 7 are at a standstill, the tape drive is stopped in one direction, whereas it is stopped in the other direction in the event that the switch is at position *b*. If switch 28 is at position *c*, positioning elements 22 and 23 will be so programmed that the tape running direction is reversed when the end of the tape is reached and the tape drive is switched off when the other end of the tape is reached. If switch 28 is at position *d*, positioning elements 22 and 23 will be so programmed that the tape running direction is reversed when the respective tape ends are reached. This then produces so-called endless operation of the cassette or spool device.

Figure 5:
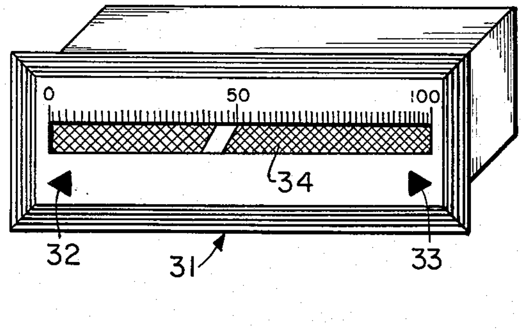
FIG. 5 is a view which shows a facility to indicate the tape supply and running direction.

Simultaneously, signals for tape supply indication and/or running direction indication may be provided by positioning elements 22 and 23 via further outputs 29 and 30, respectively. In FIGS. 1 to 4 an indicator 31 is provided for this purpose, which is shown in detail in FIG. 5. Indicator 31 can be controlled as a function of the tacho-voltage or counter e.m.f. of motors 3 and 7. In the event that only one tape running speed is provided for the spool or cassette device, the tacho-voltage or counter e.m.f. can be fed directly into indicator 31. Owing to the fact that the tacho-voltage and counter e.m.f. of motors 3 and 7, respectively, are employed for the purpose of tape supply indication in accordance with the invention, the advantage is obtained that the actual condition of the tape supply appears on the indicator for each cassette. Further, illuminated symbols 32 and 33 displaying the running direction are also provided on indicator 31 (FIG. 5). The actual tape supply on each spool or each tape coil can be immediately read off for the individual tape running direction in conjunction with said illuminated symbols.

Indicator 31 may be designed as a moving-coil instrument, the moving body of the moving-coil instrument being equipped with two color panels which can be shifted into the range of display window 34 of the indicator, each color panel being assigned to a tape coil or spool. In addition, it is also expedient to design display window 34 of the indicator analogously to cassette window 35. In order to improve the display accuracy, display window 34 can be magnified.

I claim:

1. In a magnetic tape machine having two spools between which magnetic tape is transferred, the combination of:

a pair of tape-driving spindles positioned to be engaged by tape passing from one spool to the other, one spindle being driven in one direction to unwind tape from said one spool and the other spindle being driven in the opposite direction to unwind tape from said other spool, each spindle being rotated at a speed determining a desired linear speed of the tape, and first and second pinch roller means for selectively engaging the tape against one of said spindles to control the direction of tape movement;

direct drive means for holding back said one spool and for driving said other spool to take-up tape thereon when tape is being unwound from said one spool and vice versa, said direct drive means including at least one D.C. motor/generator; and control means for controlling the voltage at said motor/generator, said control means including a comparator having a first input connected to said motor/generator, a second input connected to a reference voltage source which corresponds to said desired linear speed of the tape, and an output connected back to said first input whereby to energize said motor/generator to control tension in the tape.

2. In a magnetic tape machine as defined in claim 1 wherein said direct drive means includes a second D.C. motor/generator, the motor/generator first mentioned being connected to said one spool and the second motor/generator being connected to said other spool; said control means further including a second comparator having a first input connected to said second motor/generator, a second input connected to said reference voltage source, and an output connected back to its first input whereby to energize said second motor/generator to control tension in the tape.

3. In a magnetic tape machine as defined in claim 2 wherein said control means further includes switching means for coupling the output of the comparator first mentioned and the output of said second comparator respectively to said first and second pinch roller means so as to energize the first pinch roller means and deenergize the second pinch roller means, and vice versa, to reverse the direction of tape feed when tape has been unwound from a spool.

4. In a magnetic tape machine as defined in claim 3 including an indicator for displaying the relative amounts of tape on the two spools, said indicator being connected to the outputs of said comparators.

5. In a magnetic tape machine as defined in claim 4 wherein said switching means has a position for disabling both of said pinch roller means when the tape is completely unwound from a spool.

6. In a magnetic tape machine as defined in claim 3 wherein said switching means has a position for disabling both of said pinch roller means when the tape is completely unwound from a spool.

7. In a magnetic tape machine as defined in claim 1 including an indicator for displaying the relative amounts of tape on the two spools, said indicator being connected to the output of said comparator.

8. In a magnetic tape machine as defined in claim 2 including an indicator for displaying the relative amounts of tape on the two spools, said indicator being connected to the outputs of said comparators.

9. In a magnetic tape machine as defined in claim 1 wherein said control means further includes switching means for coupling the output of said comparator to said first and second pinch roller means so as to energize the first pinch roller means and deenergize the second pinch roller means, and vice versa, to reverse the direction of tape feed when tape has been unwound from a spool.

10. In a magnetic tape machine as defined in claim 9 wherein said switching means has a position for disabling both of said pinch roller means when the tape is completely unwound from a spool.

11. In a magnetic tape machine as defined in claim 10 including an indicator for displaying the relative amounts of tape on the two spools, said indicator being connected to the output of said comparator.

* * * * *